United States Patent
Vincent

(10) Patent No.: US 10,541,612 B2
(45) Date of Patent: Jan. 21, 2020

(54) METHOD AND APPARATUS FOR CONTROLLING AN ELECTRIC PUMP OF A HYDRAULIC BRAKING CIRCUIT

(71) Applicant: TRW Limited, Solihull, West Midlands (GB)

(72) Inventor: Kenneth Vincent, Alcester (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/534,337

(22) PCT Filed: Dec. 8, 2015

(86) PCT No.: PCT/GB2015/053753
§ 371 (c)(1),
(2) Date: Jun. 8, 2017

(87) PCT Pub. No.: WO2016/092289
PCT Pub. Date: Jun. 16, 2016

(65) Prior Publication Data
US 2017/0346399 A1 Nov. 30, 2017

(30) Foreign Application Priority Data
Dec. 8, 2014 (GB) .................................. 1421791.3

(51) Int. Cl.
*H02M 3/158* (2006.01)
*B60T 17/02* (2006.01)
(Continued)

(52) U.S. Cl.
CPC ........... *H02M 3/1582* (2013.01); *B60T 7/042* (2013.01); *B60T 17/02* (2013.01); *G05F 1/575* (2013.01); *B60R 16/033* (2013.01)

(58) Field of Classification Search
CPC ...... H02M 3/1582; B60T 7/042; B60T 17/02; G05F 1/575; B60R 16/033
See application file for complete search history.

(56) References Cited

U.S. PATENT DOCUMENTS 6,299,260 B1 10/2001 Hachtel
2003/0234574 A1* 12/2003 Reuter .................... B60T 8/368
303/116.2

(Continued)

FOREIGN PATENT DOCUMENTS

DE 10324250 A1 12/2004

OTHER PUBLICATIONS

Patent Acts 1977: Search Report under Section 17(5), Application No. GB1421791.3 dated Jun. 15, 2015.
(Continued)

*Primary Examiner* — Jeffrey A Gblende
*Assistant Examiner* — Jye-June Lee
(74) *Attorney, Agent, or Firm* — MacMillan, Sobanski & Todd, LLC

(57) ABSTRACT

A drive circuit for an electric motor of the type which forms part of a pump in a hydraulic braking circuit of a vehicle comprises an input node, an output node and a voltage and current regulating circuit which connects the nodes and which varies the voltage and current supplied to the output node from the input node in response to a modulation strategy, the input node in use being connected to a battery supply of a vehicle and the output node connected to one side of the electric motor. The voltage and current regulating circuit comprises a switch mode power supply circuit capable of providing at the output node a voltage that is either above or below the battery supply voltage at the input node.

15 Claims, 5 Drawing Sheets

(51) Int. Cl.
*B60T 7/04* (2006.01)
*G05F 1/575* (2006.01)
*B60R 16/033* (2006.01)

(56) References Cited

U.S. PATENT DOCUMENTS

2004/0100231 A1  5/2004  Koerner et al.
2005/0213354 A1  9/2005  Pai
2008/0278136 A1  11/2008 Murtojarvi
2012/0175948 A1* 7/2012  Kamijo .................. B60L 3/003
                                              307/9.1

OTHER PUBLICATIONS

PCT International Search Report and the Written Opinion, Application No. PCT/GB2015/053753 filed Dec. 8, 2015, dated Apr. 11, 2016.

* cited by examiner

| Mode | Description | Boost Q1 | Boost Q3 | Buck Q4 | Buck Q5 |
|---|---|---|---|---|---|
| 1 | Soft-Start (Buck mode) (< 13V, 0 ~ ~30ms) | Off | On | PWM | PWM |
| 2 | Boost (KL30_P constant current control) (> 13V, ~30ms ~ ~100ms) | PWM | Off | On | Off |
| 3 | Boost (MOTOR_B+ constant voltage control ~20V) (~20V max, ~ (~110 bar)) | PWM | Off | On | Off |
| 4 | Boost (KL30_P constant current control) (< 20V, > ~400ms (110 bar)) | PWM | Off | On | Off |
| 5 | Buck (PWM Speed / Pressure) (< 13V) | Off | On | PWM | PWM |

Figure 5

METHOD AND APPARATUS FOR CONTROLLING AN ELECTRIC PUMP OF A HYDRAULIC BRAKING CIRCUIT

CROSS-REFERENCE TO RELATED APPLICATIONS

This application is the National Phase of International Application PCT/GB2015/053753 filed Dec. 8, 2015 which designated the U.S. and that International Application was published in English under PCT Article 21(2) on Jun. 16, 2016 as International Publication Number WO 2016/092289 A1. PCT/GB2015/053753 claims priority to Great Britain Application No. 1421791.3, filed Dec. 8, 2014. Thus, the subject nonprovisional application claims priority to Great Britain Application No. 1421791.3, filed Dec. 8, 2014. The disclosures of both applications are incorporated herein by reference.

BACKGROUND OF THE INVENTION

This invention relates to improvements in controller circuits for an electric pump incorporated into braking circuits for vehicles and to an improved method of operating an electric pump.

It is known to provide a hydraulic braking circuit of a vehicle of the kind comprising a hydraulic circuit connecting a source of pressure to a piston of a brake caliper. The source of pressure may comprise a fluid reservoir which is charged by an electric pump. The pressurised fluid in the reservoir may be used as an alternative, or as assistance to, the increase in pressure that occurs when a driver presses a brake pedal of the vehicle to operate a master cylinder. The additional pressure supplied by the reservoir may be used to prime the brake circuit upon initial detection of a driver pressing the brake pedal, thereby reducing the time it takes to bring the brakes up to sufficient pressure to produce useful braking force. It may be used to provide emergency braking as well, for instance if a sensor detects that an emergency stop is required the pump may be used to create the pressure needed to apply the brakes independent from the operation of the brake pedal. In addition it may be used to provide electronic stability control where the brakes are applied in the event that the vehicle is losing traction.

The pressure in the circuit may be increased by an electric pump, and in the prior art electric pumps include motors that have been driven by high frequency pulse width modulation of the voltage applied to the pump. This enables the pressure provided by the pump to be precisely controlled during application of the brakes or during an assistance mode such as anti-lock brake operation of electronic stability control. The size of the motor used is typically chosen so that the maximum pressure that is needed during any of these operations can be attained with the motor operating at a nominal peak operating powers. For pressures below that peak the PWM modulation reduces the average voltage applied the motor, reducing the motor speed.

One important requirement from the pump is an ability to rapidly increase the pressure in the circuit at the start of a stop. The faster the pump can increase the pressure in the system the sooner there is enough pressure for the brakes to be applied and the sooner the vehicle can brought to a stop. This reduces braking distances and increases safety. The rate at which a pump can increase the pressure is generally determined by the swept volume of the pistons or vanes of the pump, and the peak power of the electric motor that is used to move the pistons or vanes. A larger pump needs a higher power motor to drive it. A more powerful pump and motor will be able to increase pressure of the fluid faster than a smaller one for a given peak input voltage, as the bigger motor will try to draw more current from the motor. However, larger motors are not desirable as they are more costly than smaller motors.

The power that can be drawn by the motor is limited in prior art systems by the voltage available from the battery. This is typically set at around 13-14 volts for a passenger vehicle such as a car or light van, and cannot be increased without a redesign of all of the other electrical components of the vehicle. The voltage may drop considerably lower than this, perhaps to less than 10 volts, in some high load circumstances. Using a more powerful motor will draw more current but this is often not desirable. Drawing more current not only increases the power consumption but increases the rate at which the battery will drain. This is particularly the case for luxury vehicles which may have a large number of other electrical systems on board such as air conditioning, heated seats, electric window heaters, audio systems and so on, which also make high demands for current. Too much current can cause the battery to run flat. Another possible problem that can occur with high current drain is that it can cause the wiring loom to overheat. This could be ameliorated by increasing the gauge of the wires in the loom, but this increases cost and weight.

SUMMARY OF THE INVENTION

The present invention aims to address the problem of providing rapid increase of pressure in a braking system whilst limiting the average current drawn by the electric pump.

According to a first aspect the invention provides a drive circuit for an electric motor of the type which forms part of a pump in a hydraulic braking circuit of a vehicle, the drive circuit comprising:

an input node, an output node and a voltage and current regulating circuit which connects the nodes and which varies the voltage and current supplied to the output node from the input node in response to a modulation strategy, the input node in use being connected to a battery supply of a vehicle and the output node connected to one side of the electric motor, in which the voltage and current regulating circuit comprises a switch mode power supply circuit capable of providing at the output node a voltage that is either above or below the battery supply voltage at the input node.

In the past, the drive circuit has provided only a voltage limiting (buck) function, where the output voltage is always the same or less than the battery supply voltage. The invention here provides PWM control which enables the voltage applied to the motor to exceed the battery voltage. This provides the flexibility to decrease the time the motor needs to get up to speed by providing a period of increased power whilst managing the average current consumed over a given time by the motor. When operating in boost mode more power can be applied for a given average current, allowing a small motor to be used for a given pressure rise rate where a larger motor would be needed from a buck only controller. This reduces the need for larger and more expensive motors.

The switch mode power supply may therefore comprise a buck-boost circuit which comprises a boost converter followed by a buck converter, with the buck and boost parts sharing common components.

The switch mode power supply circuit may include a PWM controller which is adapted to supply pulse width modulated control that control the current and voltage provided at the output node.

The boost part of the drive circuit may comprise the following parts:

An inductor connected in series with the input node and an intermediate node, a switch connecting the intermediate node to a ground, a second switch connected in series with the intermediate node and a second intermediate node which forms an input to the buck circuit, and a capacitor connected between the second intermediate node and the ground.

The buck part of the drive circuit may comprise the following parts:

A first switch connected in series between the second intermediate node and the output node, a second switch connected in series between the output node and the ground, and the capacitor that connects the second intermediate node to the ground.

The buck-boost circuits therefore share a common capacitor and inductor.

The inductor of the boost circuit may form part of an EMC filter which protects the motor from noise that may be present in the battery supply line. The filter may, for instance, comprise a second capacitor connected between the input node and the ground, which acts in combination with the inductor.

This is advantageous because it minimises the number of components required, sharing the function of input filter and boost with a common inductor.

The PWM controller may include a pulse width modulation circuit which produces respective Pulse width modulated control signals for opening and closing each of the switches of the voltage and current regulating circuit as required to provide the required voltages to the motor.

The controller may provide PWM signals, in use, which cause the drive circuit to perform the following function:

During a first period of time following the start up of the motor cause the drive circuit to maintain the voltage supplied to the motor at a boosted voltage which exceeds the voltage present at the input node for a second period of time; and After the first period of time has lapsed the pwm signals cause the drive circuit to provide a reduced voltage to the motor which is less than the voltage present at the input node (a buck mode).

The first period of time may correspond to the time required for the pump driven by the motor to bring the pressure in the hydraulic system to a predefined elevated level. This level may comprise that which is required for the system to be fully pressurized.

The controller may additionally, upon start up of the motor at the beginning of the first period of time, provide pwm signals that cause the drive circuit to maintain the current supplied to the motor at a predetermined nominal value for a first period of time.

The short initial period at which the current is held at a constant value allows a fast motor speed ramp up to be achieved without excessive inrush of current occurring as may otherwise arise due to the low inductance of motors at start up.

To optimise the motor speed ramp, the current during this period may be held at the maximum permitted permanent current value for the circuit, or even above that level. This will vary from application to application, and is typically limited by the heat dissipation allowed from the battery supply circuit.

Once moving, when the inductance of the motor has fallen and excessive current inrush is not a concern, the drive circuit changes to provide a constant voltage to the motor which exceeds the battery supply voltage. This mode allows the motor to speed up at a faster rate than could be achieved without a boosted voltage, whilst drawing less current on average than was drawn in the first period. The voltage is held at the required high level and the motor is free to draw whatever current it demands.

The voltage in the second mode may be around 20 volts when the battery supply voltage is nominally 12 volts to 13 volts.

After that second period of time has ended and pressure is at the required elevated level the motor will be controlled in a typical voltage regulated manner as known in the prior art, keeping voltages below the supply voltage which provides a more efficient mode of operation from the drive circuit compared with a boost mode.

The sequence of modes described, which can only be attained from a drive circuit of the invention, allows the motor to be brought up to speed very quickly using the maximum available power, whilst keeping the average current draw lower than would be possible without the voltage boost. This is because the boost phase allows the motor to be run using relatively less current for a given power input (since Power=current multiplied by voltage).

The controller may operate in the initial constant current mode for a first period of time which is only long enough for the motor inductance to drop to level where the voltage can be safely boosted. This first period may last for less than one tenth of a second. Similarly, the second period of time may be kept as short as possible, ending once the pressure in the circuit has reached a predetermined level.

This may be around 1 second to 2 seconds after start up.

In a refinement, the controller may, during the initial period of time, apply a current to the motor which initially exceeds the predetermined permanent acceptable current draw for a very short period of time, gradually or stepwise dropping this down to the nominal maximum current value. The period during which it is at the high level may be very short, perhaps less than 10 percent of the initial period of time. This increase in current allows an initially lower voltage to be supplied, giving a Soft-start to the motor.

According to a second aspect the invention provide a braking circuit for a vehicle comprising:

a hydraulic circuit comprising at least one brake piston and an enclosed volume of hydraulic fluid;

A pump which is driven by an electric motor and which, upon operation of the pump following start up of the motor, rapidly increases the pressurise of the fluid in the circuit to an elevated level;

and a motor drive circuit according to the first aspect of the invention which is associated with the pump.

According to a third aspect the invention provides a method of operating an electric motor of a pump of a hydraulic braking circuit during an initial period commencing with the start up of the motor following a request for an increase of pressure in the circuit, the electric motor being connected by a drive circuit to a battery of a vehicle, the battery having a nominal supply voltage, the method comprising the steps of:

(a) During a first predetermined period of time following start up of the motor causing the drive circuit to apply a boosted voltage to the motor which exceeds the voltage present at the input node (a boost mode) for a second period of time; and (b) after the first period of time has lapsed causing the drive circuit to provide a reduced voltage to the motor which is less than the voltage present at the input node (a buck mode).

The method may also comprise, upon start up of the motor at the beginning of the first period of time causing the drive circuit to provide a constant current to the motor for a first period of time.

In the initial period the method may apply an average current that is equal to the allowed permanent current draw from the battery supply. It may be constant through the whole of the initial period.

The method may commence the first period of time immediately upon a demand for the motor to start up.

In the following period the higher voltage may be held at a constant maximum value, which may be at least 10 percent, or at least 25 percent or at least 50 percent above the battery supply voltage.

By providing a short initial period of nominal maximum current to the motor, a fast motor start is achieved without excessive voltages present as may arise due to the low inductance of motors at start up.

Once moving, when the inductance of the motor has fallen, the drive circuit changes to provide a high constant voltage which helps to increase the rate at which the motor continues to accelerate whilst using less current than was drawn in the first period. After that second period has ended the motor will be controlled in a typical manner as known in the prior art.

This operation allows the motor to be brought up to speed very quickly using the maximum available power, whilst keeping the average current draw lower than would be possible without the voltage boost. This is because the boost phase allows the motor to be run using relatively less current for a given power input (since Power=current multiplied by voltage).

The method may comprise causing the drive circuit to operate in the initial mode for a first period of time which is only long enough for the motor inductance to drop to a useful level. This may be less than one second. Similarly, the second period of time may be kept as short as possible, ending once the pressure in the circuit has reached a pre-determined level.

In a refinement, the method may comprise, during the initial period of time, applying a current to the motor which initially exceeds the permanent current draw for a very short period of time, gradually or stepwise dropping this down to the nominal maximum current value. The period during which it is at the high level may be very short, perhaps less than 10 percent of the initial period of time, which is too short to cause overheating of the battery supply circuit. This increase in current allows an initially lower voltage to be supplied, giving a Soft-start to the motor.

The method enables a rapid increase of pressure to be achieved whilst the average current drawn is maintained at a lower level than could be achieved using a prior art method that does not provide for a voltage boost.

Various aspects of this invention will become apparent to those skilled in the art from the following detailed description of the preferred embodiment, when read in light of the accompanying drawings.

BRIEF DESCRIPTION OF THE DRAWINGS

FIG. 5 is a table showing the PWM operation of each switch of the drive circuit during the different modes.

DETAILED DESCRIPTION OF THE PREFERRED EMBODIMENT

Figure 1:
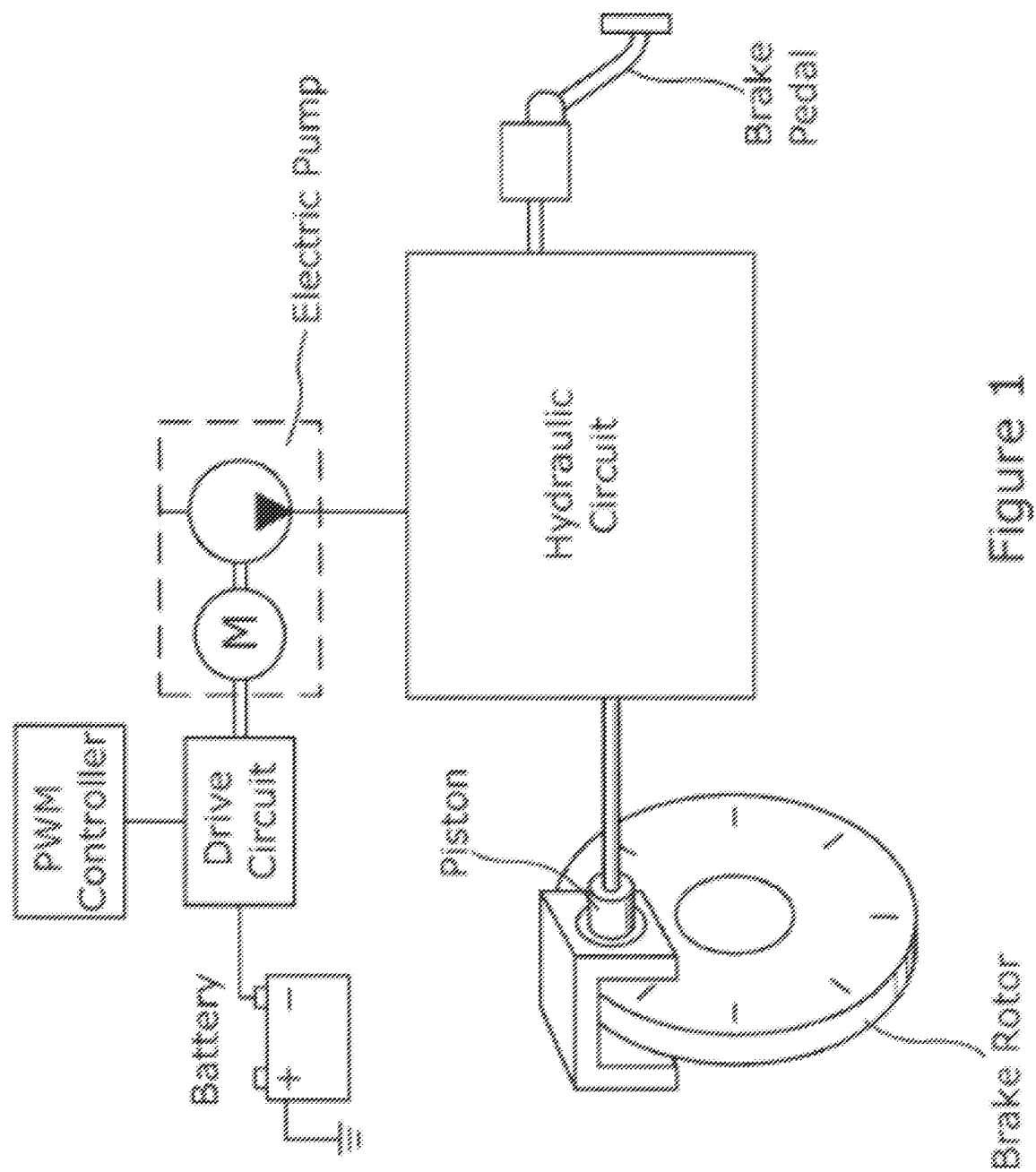
FIG. 1 is an overview of a vehicle with a part of a hydraulic braking circuit and pump control shown.

As shown in FIG. 1, a vehicle (not shown) includes a hydraulic braking circuit that supplied hydraulic fluid to a piston of one brake. The piston presses a pad against a rotor, the pressure applied being determined by the pressure of the fluid. In normal running the pad is held clear of the rotor and the rotor turns freely with the associated wheel of the vehicle. During braking the pressure is increased, which causes the friction force between the pad and rotor to increase. This generates heat, and the conversion of the rotational energy of the disk to heat is the main mechanism by which the brakes slow the wheel of the vehicle.

The pressure of the fluid is controlled by a driver pressing a brake pedal, which operates a master cylinder. In addition, a pump is provided in the circuit. The pump includes an electric motor and at least one piston, the piston moves as power is supplied to the motor, and this movement of the piston pressurises the fluid in the circuit. The pump allows the pressure to be rapidly increased independent of the driver operating the pedal, allowing the brakes to be pre-pressurised when the vehicle senses an emergency stop is needed, or perhaps to provide the pressure needed to allow the brakes to be operated independent of the brake pedal for an anti-lock braking or electronic stability control operation.

The motor is connected to a battery of the vehicle through a drive circuit. The drive circuit comprises a voltage and current regulating circuit which includes a PWM controller. The PWM controller typically comprises a micro-controller and provides PWM signals to the controller in response to input signals supplied to it from various sensors and other components around the vehicle (not shown) as a function of an inbuilt control algorithm. The PWM control of the controller regulates the current and the voltage supplied to the motor at any time, and therefore controls the operation of the pump.

The controller is isolated from the battery by a EMC filter, which prevents electrical noise on the battery supply line reaching the controller and motor. The noise may damage the motor if it is not filtered out. As will be described, the filter and controller of this embodiment used shared components and are therefore at least partially integrated.

Figure 2:
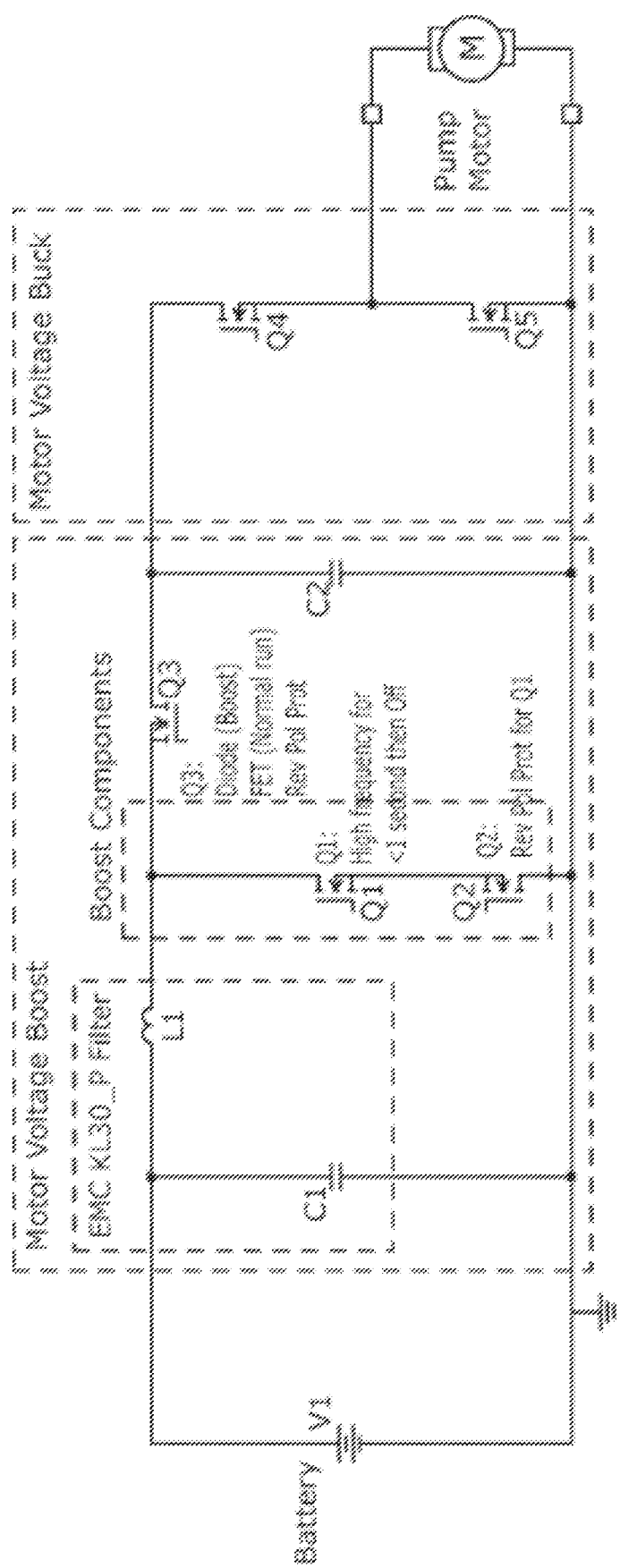
FIG. 2 is a more detailed view of the controller of the pump, the motor and battery supply.

The drive circuit is shown in detail in FIG. 2 of the drawings. It comprises switch mode power supply and specifically comprises a buck-boost circuit that has an input which is connected to the battery supply and an output connected to one side of the motor, the circuit regulating both the current and voltage available at the output and in particular enabling a voltage to be supplied to the motor in excess of the battery supply voltage when required.

The boost part of the circuit comprises an inductor L1 connected in series with the input node and an intermediate node, a switch (field effect transistor Q1) connecting the intermediate node to a ground, a second switch (field effect transistor Q3) connected in series with the intermediate node and a second intermediate node which forms an input to the buck circuit, and a capacitor C2 connected between the second intermediate node and the ground.

The buck part of the circuit comprises a switch (field effect transistor Q4) connected in series between the second intermediate node and the output node, a switch (field effect transistor Q5) connected in series between the output node and the ground, and the capacitor C2 and inductor L1. The buck-boost circuits therefore share a common capacitor and inductor as an energy store.

Each switch in this embodiment comprises a FET transistor, but could be another transistor type, and each switch may be opened or closed by application of a control signal to the base of the transistor. Some of these signals may comprise PWM signals.

The inductor L1 of the boost part is used here to form one half of an LC filter which provides the battery EMC filtering function. The Capacitor C1 of the filter is connected between the input node and the ground. This sharing of components helps reduce the cost of the circuit and increases reliability.

The PWM controller has three outputs, each being modulated between a high state and a low state in a high frequency PWM mode, and providing the drive to the switches Q1, Q4 and Q5 of the of the buck-boost circuit. A further output can be switched from high to low but is not PWM modulated and this is applied to switch Q3. When an output is high the switch is open, and when low the switch is closed.

Figure 3:
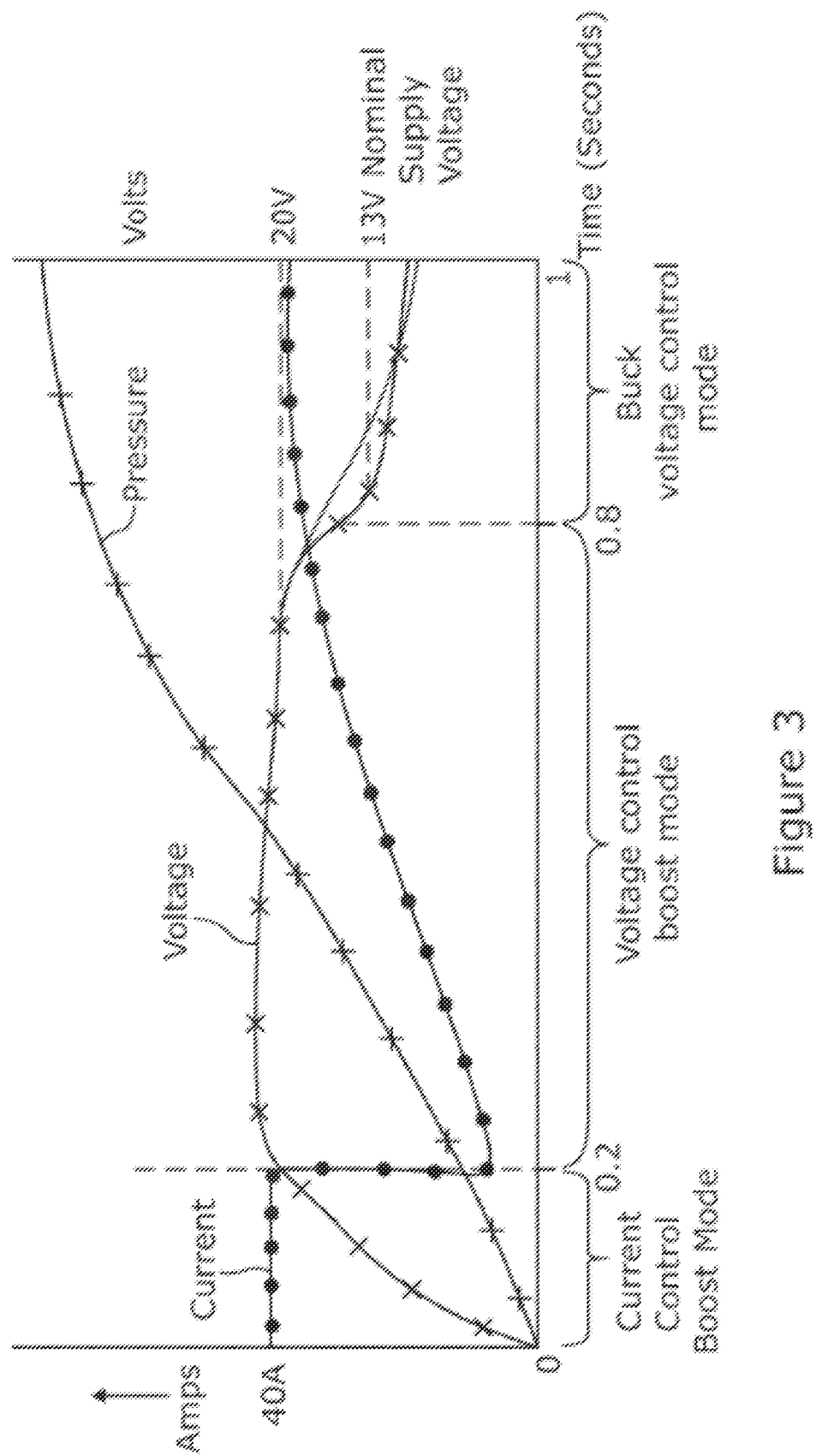
FIG. 3 is a graph showing the change in current and voltage at the motor over time during the different modes of operation of the drive circuit during start up of the electric pump.

The PWM controller, in use, provides the required signals following a requested start up of the motor which define several modes of operation: an initial soft start mode, a short current regulated mode, a short voltage boosted mode, and a following voltage controlled (buck) mode. Each mode is implemented in sequence for a predetermined period of time. The purpose of the sequence of modes is to get the pressure from the pump up to a required level as fast as possible whilst limiting the average current drawn during the time that the pump needs to get up the required level. Plots of motor voltage, motor current and hydraulic fluid pressure against time for all the modes are shown in sequence in FIG. 3, with time t=0 corresponding to the time at which a demand for the motor to start is made. The first and second periods of time last for around 1 second or less, at the end of which the pressure of the fluid has reached the required elevated level.

Optional Soft Start Mode (Mode 1)

Figure 4:
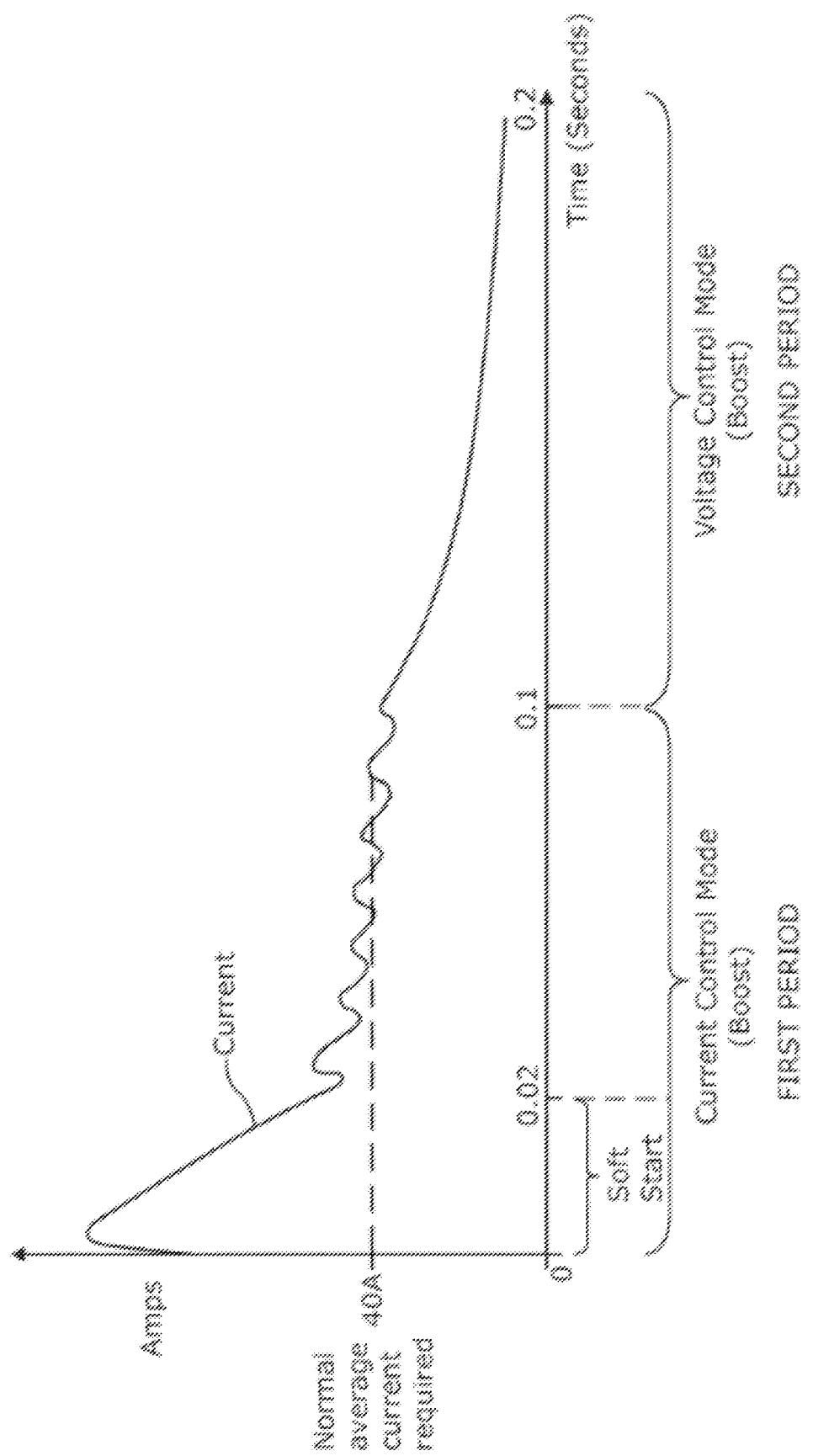
FIG. 4 is a graph showing in more detail the change in current and voltage at the motor over time during an initial soft start mode of operation of the controller.

The soft start mode, together with the following current controlled mode, together define a first period of time in which the drive circuit regulates the current applied to the motor whilst keeping the voltage to a level at or below the supply voltage. The soft start mode is shown in detail in FIG. 4. In this mode the drive circuit operates as a buck mode power supply, with the voltage is not allowed to exceed the supply voltage but the current being the controlled variable. This helps prevent a sudden inrush of current as would otherwise occur in boost mode due to the initial low inductance of the motor.

Current Regulated Boost Mode (Mode 2)

After the initial soft start mode, during the remainder of the first period of time, the current supplied to the motor is kept at a constant level equal to the allowed permanent current draw defined by the vehicle designers. It lasts for a period of time sufficient to start the motor spinning up to the speed at which the inductance of the motor falls to a usable level for voltage control. Initially, when a motor is stationary, it has a very high inductance. Once spinning a back emf will be created which causes the inductance to fall. If inductance is too high and the motor is not current controlled, it may draw far too high a current which will cause damage to the motor. The drive circuit operates in a boost mode, allowing the voltage to exceed the supply voltage to maximise the power that the motor can draw for the constant voltage.

Voltage Boost (Mode 3)

Once spinning, and the inductance has fallen sufficiently the voltage is controlled rather than the current by holding the voltage at a boosted level above that of the supply voltage. The motor will therefore draw a higher power than would be possible without the boost, and yet the average current drawn in this period remains relatively low compared with that which would be needed to give the same power at the supply voltage (as could be achieved with a larger motor for example). This mode continues for a time sufficient for the pressure to reach the required level.

After a set period, the boost control continues but the voltage is gradually reduced over the period (Mode 4).

Buck Mode (Mode 5)

After the motor reaches the required speed and the pressure has reached the required level, the controller reverts to a more standard buck mode in which the voltage is regulated and does not exceed the battery supply voltage.

FIG. 5 shows the operation of the switches during each of the modes. In the buck mode the switch Q1 is off and switch Q3 is on, whilst PWM signals are applied to the switches Q4 and Q5. In the boost mode, switch Q4 is permanently on, and switch Q5 is permanently off along with switch Q3. PWM is applied to the switch Q1 only.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A drive circuit for an electric motor of the type which forms part of a pump in a hydraulic braking circuit of a vehicle, the drive circuit comprising:
   an input node, an output node and a voltage and current regulating circuit which connects the input node and the output node and which varies voltage and current supplied to the output node from the input node in response to a modulation strategy,
   the input node in use being connected to a battery supply of the vehicle and the output node connected to one side of the electric motor,
   in which the voltage and current regulating circuit comprises a switch mode power supply circuit capable of providing at the output node a voltage that is either above or below a battery supply voltage at the input node,
   in which the switch mode power supply comprises a buck-boost circuit which comprises a boost converter followed by a buck converter, with the buck converter and boost converter sharing common components,
   in which the switch mode power supply circuit includes a PWM controller which is adapted to supply pulse width modulated control that controls the voltage and current supplied to the output node, and
   in which the PWM controller provides PWM signals, in use, which cause the drive circuit to perform:
   (a) during a first period of time following a start-up of the electric motor cause the drive circuit to maintain a voltage supplied to the electric motor at a boosted voltage which exceeds a voltage present at the input node for a second period of time that is within the first period of time; and (b) after the first period of time has lapsed the PWM signals cause the drive circuit to provide a reduced voltage to the electric motor which is less than the voltage present at the input node.

2. The drive circuit according to claim 1 in which the boost converter of the drive circuit comprises:

an inductor connected in series with the input node and an intermediate node, a switch connecting the intermediate node to a ground, a second switch connected in series with the intermediate node and a second intermediate node which forms an input to the buck converter, and a capacitor connected between the second intermediate node and the ground.

3. The drive circuit according to claim 2 in which the buck converter comprises:

a first switch connected in series between the second intermediate node and the output node, a third switch connected in series between the output node and the ground, and the capacitor that connects the second intermediate node to the ground, so that the buck converter and boost converter share a common capacitor and inductor.

4. The drive circuit according to claim 2 in which the inductor of the boost converter forms part of an EMC filter which protects the electric motor from noise that may be present in the battery supply voltage.

5. The drive circuit according to claim 1 in which the PWM controller includes a pulse width modulation circuit which produces respective pulse width modulated control signals for opening and closing switches of the voltage and current regulating circuit as required to provide required voltages to the electric motor.

6. The drive circuit according to claim 1 in which the first period of time corresponds to a time required for the pump driven by the electric motor to bring a pressure in the hydraulic system to a predefined elevated level.

7. The drive circuit according to claim 1 arranged to additionally, upon start-up of the electric motor at the beginning of the first period of time, provide PWM signals that cause the drive circuit to maintain the current supplied to the electric motor at a predetermined nominal value for a first period of time.

8. The drive circuit according to claim 7 in which the first period of time is only long enough for a motor inductance to drop to level where the voltage supplied to the electric motor can be boosted.

9. The drive circuit according to claim 1 in which the second period of time ends once a pressure in the circuit has reached a predetermined level.

10. A drive circuit according to claim 1 in which the PWM controller, during an initial period of time, is arranged to apply a current to the electric motor which initially exceeds a predetermined permanent acceptable current draw for a very short period of time, gradually or stepwise dropping the current down to a nominal maximum current value.

11. A braking circuit for a vehicle comprising:

a hydraulic circuit comprising at least one brake piston and an enclosed volume of hydraulic fluid;

a pump which is driven by an electric motor and which, upon operation of the pump following start-up of the electric motor, rapidly increases the pressure of the fluid in the circuit to an elevated level; and a drive circuit according to claim 1.

12. A method of operating an electric motor of a pump of a hydraulic braking circuit during an initial period commencing with the start-up of the electric motor following a request for an increase of pressure in the hydraulic braking circuit, the electric motor being connected by a drive circuit to a battery of a vehicle, the battery having a nominal supply voltage, the method comprising steps of:

(a) during a first predetermined period of time following start-up of the electric motor causing the drive circuit to apply a boosted voltage to the electric motor which exceeds a voltage present at the input node for a second period of time that is within the first period of time; and (b) after the first predetermined period of time has lapsed causing the drive circuit to provide a reduced voltage to the electric motor which is less than the voltage present at the input node.

13. The method of claim 12 which further comprises, upon start-up of the electric motor at a beginning of the first predetermined period of time causing the drive circuit to provide a constant current to the electric motor for the first predetermined period of time.

14. The method of claim 12 where in an initial period the method may apply an average current that is equal to an allowed permanent current draw from a battery supply.

15. The method of claim 12 in which the first predetermined period of time commences immediately upon a demand for the electric motor to start up.

* * * * *